2,923,679

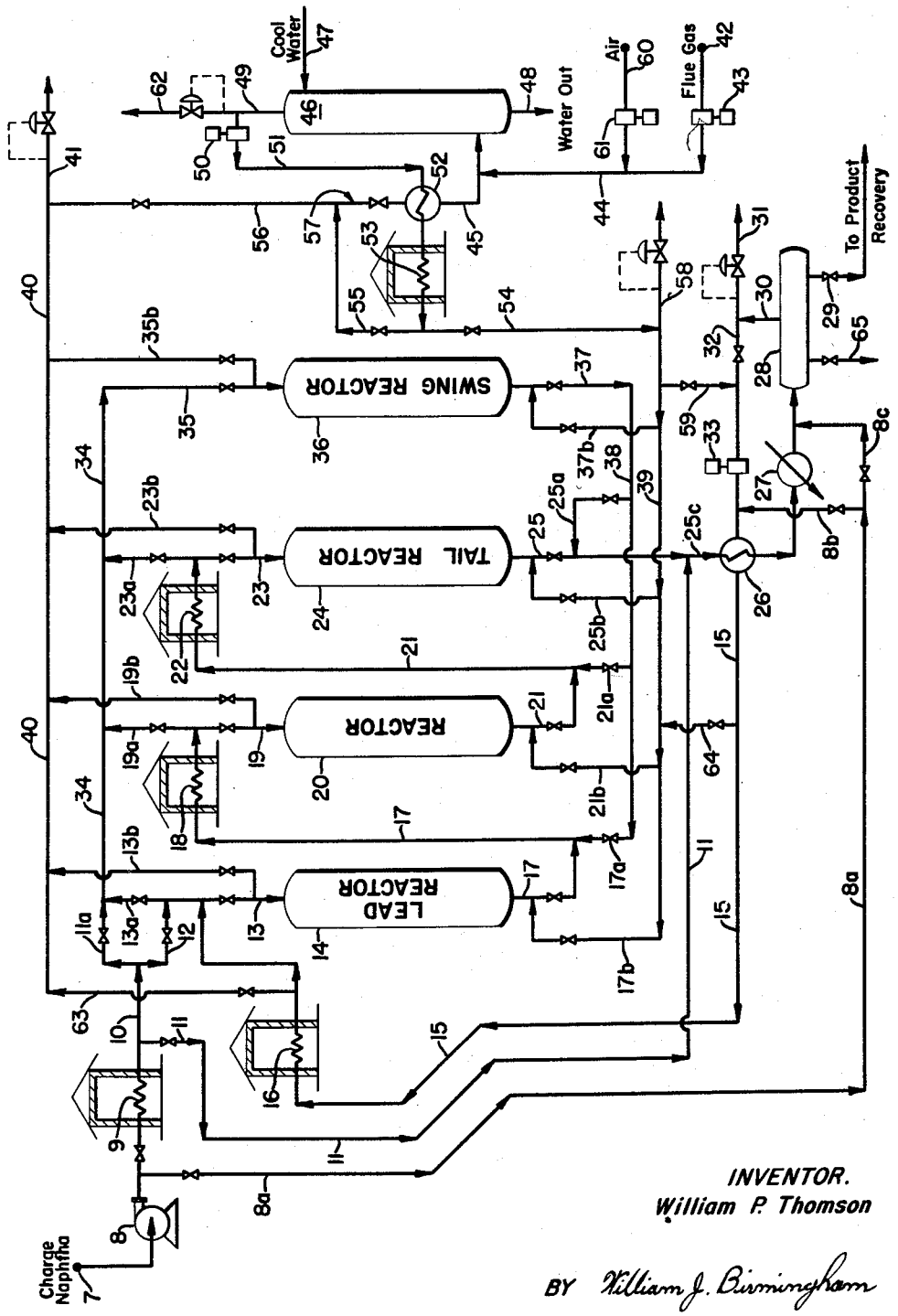
Feb. 2, 1960 — W. P. THOMSON — 2,923,679
PLATINUM-ALUMINA CATALYST REGENERATION PROCEDURE
Filed May 23, 1957
INVENTOR.
William P. Thomson
BY William J. Birmingham
ATTORNEY ވ
United States Patent Office 2,923,679
Patented Feb. 2, 1960

PLATINUM-ALUMINA CATALYST REGENERATION PROCEDURE

William P. Thomson, Alton, Ill., assignor to Standard Oil Company, Chicago, Ill., a corporation of Indiana Application May 23, 1957, Serial No. 661,202

7 Claims. (Cl. 208—140)

This invention relates to an improved procedure for regenerating platinum-alumina catalyst, and it pertains more particularly to a method for avoiding deactivation caused by sulfate poisoning of the platinum-alumina catalyst during regeneration.

Platinum-alumina catalysts are used extensively in the conversion of hydrocarbons, particularly in the hydroforming of petroleum naphthas to increase the octane numbers thereof. In a typical hydroforming cycle, a mixture of petroleum naphtha and hydrogen-containing gas is passed through a bed of platinum-alumina catalyst containing between about 0.05 and 1 percent by weight of platinum, at a temperature in the range of about 800 to 1000° F., elevated pressure, i.e., a pressure between about 50 and 1000 pounds per square inch, a hydrogen rate in the range of about 1,000 to 10,000 standard cubic feet per barrel of charging stock, and an hourly weight space velocity between about 0.1 and 10.

Under such processing conditions the catalytic properties of platinum-alumina catalyst gradually decline over a period of time as a result of carbon deposits and/or other physical and chemical changes in the platinum and/or supporting materials. Moreover, if the hydrocarbons being converted contain substantial sulfur, e.g., above about 20 parts per million, sulfide corrosion of vessels, lines, and, in particular, furnace tubes results. Corrosion products, usually in the form of iron sulfide scale, are carried over to and accumulate on top of the catalyst bed, particularly after the system has been subjected to substantial thermal shock. Scale on the catalyst bed causes pressure-drop difficulties, and, in regenerative systems, such as exemplified by Ultraforming (Snuggs et al. U.S.P. 2,773,014, Dec. 4, 1956, and Petroleum Engineer, vol. XXVI, No. 4, April 1954, at page C-35) results in catalyst deactivation. This deactivation results from the fact that the oxygen introduced into recirculating flue gas for the coke-burn and any additional oxidative treatment, also oxidizes sulfur-containing iron deposits. The resulting sulfur oxides, which may include sulfur dioxide and sulfur trioxide, particularly sulfur trioxide, are recirculated to the catalyst bed, thereby causing deactivation, presumably by combining with the alumina.

It is therefore an object of the present invention to provide an improved method of regenerating platinum-alumina catalyst which has been employed in the conversion of sulfur-containing charge stocks. Another object is to provide a regeneration procedure which protects platinum-alumina catalyst from sulfate poisoning. Another object is to provide an improved regeneration technique which minimizes pressure drop difficulties resulting from scale deposits on the catalyst bed. Another object is to convert ferrous scale products which accumulate on catalyst beds to a form which permits trapping of deleterious substances, e.g., sulfur, during subsequent cycles. These and other objects of the present invention will become apparent as the detailed description proceeds.

To regenerate a bed of platinum-alumina catalyst without risking sulfate poisoning, the catalyst is first contacted with recycled flue gas at elevated pressure, i.e., about 50–1000 pounds per square inch gage, in the direction opposite to that of hydrocarbon flow. Since in most fixed-bed catalytic conversion processes reactants flow in a downward direction, so as to avoid lifting of the catalyst bed, my flue gas is accordingly recirculated up-flow. When the catalyst bed temperature is in the range of about 600–1000° F., e.g., 700° F., as adjusted by heating or cooling the recirculated gases, controlled amounts of oxygen, e.g., 0.2 to 2 mol percent, usually in the form of air, are introduced into the recirculating flue gas stream. A combustion front results which progressively passes through the catalyst bed as coke deposits are burned. The amount of oxygen introduced is regulated so as not to exceed a combustion front temperature of about 1300° F., preferably not above 1050° F. As the combustion front approaches the top of the catalyst bed, the addition of oxygen, in accordance with my invention, is stopped before any substantial amounts of oxygen come in contact with the iron sulfide scale accumulated at or near the top of the catalyst bed. The reactor containing the catalyst bed is then depressured, preferably to about atmospheric pressure. Flue gas is then passed up-flow through the catalyst bed on a once-through basis. Sufficient oxygen is added to the once-through flue gas to complete combustion of any carbon deposits not previously removed and to oxidize sulfur-containing iron scale to sulfur oxides and iron oxides. The once-through purging continues until substantially all sulfur oxides are removed from the reactor. The reactor is then repressured to elevated pressure and flue gas is again recirculated while simultaneously being cooled or heated so as to adjust the temperature of the catalyst bed to conversion temperature. During recirculation, the flue gas preferably contains a small amount of oxygen, i.e., above about 0.1 mol percent, to assure substantially complete absence of carbon monoxide, which also poisons platinum-alumina catalyst.

If additional high-temperature oxidative treatments are desired, the temperature and oxygen content of the circulating flue gas may be raised at this point. The reactor is then returned to on-stream operation by methods of the prior art. For example, to return the reactor to reforming operation, the reactor may be purged at elevated pressure with flue gas until the oxygen content is reduced to about 0.1 to 1 mol percent. The reactor is then depressured, preferably to about atmospheric pressure, and is again purged with an oxygen-free inert gas, e.g., nitrogen, flue gas, and the like, preferably flue gas, until oxygen is eliminated. The reactor is then purged with hydrogen-rich recycle gas and repressured to reforming pressure, following which naphtha vapors are introduced.

While the direction of flow has been described for convenience as down-flow or up-flow, it should be understood that it is essential to my invention that both the initial coke burn at elevated pressure and my once-through purge at reduced pressure be carried out in a direction opposite to that of hydrocarbon flow. Thus, oxygen in the flue gas contacts the catalyst bed prior to contacting the sulfur-containing iron deposits. In the case of horizontal or radial flow reactors and the like, or in the case of vertical reactors with up-flow hydrocarbon flow, the up-flow or down-flow terminology used herein should be considered relative and should be interpreted in accordance with the spirit of the invention.

To determine when the flame or combustion front approaches the top or end of the catalyst bed, it is convenient to be guided by the temperature rise as shown on reactor thermocouples. For conversion systems wherein recirculated flue gas is water washed before being returned to the reactor, another convenient method for determining when the flame front is near the top of the catalyst bed is to watch for a drop in pH of the water wash. Since a small and relatively harmless amount of sulfur oxides are initially formed as the combustion front approaches the iron sulfide deposits, some of these sulfur oxides are picked up by the water and thus reduce the pH. Commercial practice has shown that once the pH drops below about 5, oxygen input should be stopped and the reactor depressured for my once-through oxygen-containing flue gas purge. Commercial practice has also shown that water washing will not remove enough of the sulfur oxides to avoid catalyst deactivation without substantial redesign of the usual water washing facilities and/or without addition of various chemicals to the wash water.

As is apparent from the above description, my regeneration procedure assures removal of sulfur-containing iron deposits without any substantial contact of sulfur oxides and platinum-alumina catalyst. By carrying out my once-through step at reduced pressure, i.e., about atmospheric pressure, any sulfur oxides already formed are substantially removed from the reactor. Once-through operation at reduced pressure also assures improved gas flow distribution as contrasted with flow distribution that would be obtained with the same circulator means at substantially higher pressure. Conversion of iron deposits from the iron sulfide form to the iron oxide form, and thence, during subsequent purging and/or processing with hydrogen, to elemental iron, breaks up and fragments the crust of scale that is often formed on top of the catalyst bed, thereby alleviating pressure drop difficulties. The resulting elemental iron also serves as a sulfur trap, i.e., it combines with any incoming sulfur during subsequent processing and, thus, prevents contact of the sulfur with the platinum-alumina catalyst.

The invention will be more clearly understood by references to the following example read in conjunction with the accompanying drawing which is a schematic flow diagram of an Ultraforming system in which my procedure for regenerating platinum-alumina catalyst is particularly advantageous.

In normal operation of an Ultraforming system a naphtha charge such as, for example, the 200 to 360° F. fraction of Mid-Continent virgin naphtha having a sulfur content of about 100 to 400 parts per million is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with hydrogen-rich recycle gas from line 15 which is preheated in heater 16. Effluent from reactor 14 passes through line 17, reheater 18 and transfer line 19 to reactor 20. Effluent from reactor 20 passes through line 21, reheater 22 and transfer line 23 to tail reactor 24. It should be understood that more than three reheater-reactor stages may be employed in the system.

Effluent from the tail reactor flows through lines 25 and 25c, heat exchanger 26, and cooler 27 to separator 28 from which hydroformed product is withdrawn through line 29 to a stabilizer and/or conventional product recovery system. A part of the hydrogen-rich gas withdrawn from the separator through line 30 may be vented through line 31, but usually about 1,000 to 10,000 cubic feet per barrel of charge is recycled through line 32 by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a, and 25b remain closed and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina; it may be prepared by compositing a platinum chloride with an alumina support as described, for example, in U.S. Patent 2,659,701, and it preferably contains about .3 to .6 weight per cent of platinum.

The on-stream pressure is usually below about 400 pounds per square inch gage, e.g., in the range of 200 to 350 pounds per square inch gage. The inlet temperatures to each reactor are usually in the range of about 800 to 1000° F., e.g., about 920° F., and may be approximately the same for each reactor although it is sometimes desirable to employ somewhat lower inlet temperature to the initial reactor than to the remaining reactors. The overall weight space velocity may be in the range of about 0.5 to 5 pounds of naphtha per pound of catalyst per hour. There is, of course, a pressure drop in the system so that the lead reactor may operate at about 20 to 100 pounds per square inch higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, if desired, hydrogen-rich gas may be introduced from line 15 via line 64 to manifold line 39 by line 64 and thence through one of lines 17b, 21b, 25b, or 37b to the selected reactor.

For effecting purging and/or regeneration of the catalyst in any bed, purge gases and/or regeneration gases may be introduced either through manifold line 39 and a selected one of lines 17b, 21b, 25b and 37b or through manifold line 40 and a selected one of lines 13b, 19b, 23b, or 35b. Such purge and regeneration gases may be selectively withdrawn through corresponding lines at the top or bottom of the reactor, as the case may be, to the appropriate manifold. Gases may be vented or flared from manifold line 39 via valved line 58. Correspondingly, gases may be vented or flared from manifold line 40 via valved line 41.

Flue gas from source, 42, which is normally the products from combustion of hydrocarbons in air, may be introduced to the system by compressor 43 and passed by lines 44 and 45 through a drying chamber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, and heater 53 either to line 54 and manifold line 39 or to lines 55, 56 and manifold 40, when it is desired to introduce flue gas into the system for purging and/or regeneration. By closing the valve in line 54 and opening the valves in lines 55 and 57, the flue gas may be recirculated through line 57, heat exchanger 52 and line 45 back to the scrubber. Air may be introduced from source 60 by compressor 61 for effecting regeneration and/or regeneration-rejuvenation of the catalyst. Rejuvenation is an additional oxidative treatment after the regenerative coke burn. During regeneration excess flue gas may be vented from the system by line 62. Air and/or flue gas from manifold line 39 may be introduced to the inlet of circulating compressor 33 by line 59.

One unique characteristic of the Ultraforming process, in contrast with non-regenerative platinum reforming processes, is the fact that an Ultraformer can be started up without use of extraneous hydrogen. Such a startup procedure is described in co-pending application S.N. 502,604, filed April 20, 1955. During and after start-up of the system, following prior cycles in which sulfur-containing naphtha was hydroformed, iron sulfide scale is deposited on top of the catalyst bed or in screens, baskets, filters and the like at the top of the reactor. During on-stream processing the scale-like deposits often form a crust which leads to substantial pressure drop. It is the sulfur in the scale and resulting crust that ultimately leads to sulfate poisoning of the catalyst during regeneration, which poisoning my invention effectively prevents.

To illustrate my invention, the method of effecting catalyst regeneration will be described as applied to the swing reactor but it will be understood that the same procedure may be employed for any one of the other reactors when it is blocked out. When the charge inlet valve in line 35 is closed and while the valve in line 37 remains open, hot hydrogen-rich gas is introduced by line 63 to manifold line 40 and thence through line 35b to strip out any hydrocarbons that may remain in the reactor, this stripped material being discharged through lines 37, 38, 25a, and 25c. Next, the valve in lines 63 and 37 are closed and reactor 36 is depressured by opening valves in lines 37b and 58. Next, the reactor is purged to eliminate hydrogen-rich gas by introducing flue gas from the regeneration facilities via lines 55, 56, 40, and 35b, the purge gases being vented through lines 37b, 39, and 58. After the flue gas purge, valve in line 58 is closed and introduction of flue gas from source 42 is continued to pressure the reactor with flue gas to approximately the same pressure as that employed in on-stream processing, i.e., about 300 pounds per square inch gage. The temperature of the catalyst bed is adjusted to about 650 to 750° F. preparatory to initiating regeneration by circulating flue gas, under such pressure, upflow through the reactor by means of compressor 50. The circulating flue gas leaves and returns to swing reactor 36 via 35b, 40, 56, 57, 52, 45, 46, 49, 50, 51, 52, 53, 54, 39, and 37b, the appropriate valves being open or closed as the case may be. Heat may be supplied to the circulating gas by heater 53, if necessary.

Next, controlled amounts of air are introduced from source 60 by compressor 61 into the circulating flue gas stream at a rate to effect combustion of carbonaceous deposits without exceeding a combustion zone temperature of about 1050° F. The combustion front starts at the bottom of the catalyst bed and progressively passes up through the bed. The hot flue gas leaving the reactor at about this temperature passes via lines 35b, 40, 56, and 57 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 pounds per square inch gage. The cooled flue gas which is recirculated by compressor 50 may be further dried by passing through a desiccant bed (not shown) before it is returned through heat exchanger 52 to heater 53 which, during regeneration, maintains a transfer line temperature of approximately 700° F.

As the combustion front approaches the top of the catalyst bed, the supply of air from source 60 is cut-off, recirculation of the flue gas is stopped, and the system is depressured by opening valve in line 58. Approach of the combustion front to the top of the catalyst bed may be conveniently detected by thermocouples appropriately placed in the catalyst bed itself. Alternatively, approach of the combustion front may be detected by a drop in pH of the water leaving tower 46 via line 48. In practice, the pH of the water leaving via line 48 is usually above about 5 until the combustion front approaches the top of the catalyst bed. As the first traces of oxygen contact iron-sulfide scale, the pH drops rapidly below about 5.

Dropping pressure to about atmospheric pressure substantially eliminates any sulfur oxides formed prior to cutting off air from source 60. When pressure reaches about atmospheric pressure, flue gas from source 42 is purged up-flow through the catalyst bed and is vented from the system via lines 35b, 40 and 41, valve in line 56 being closed. Sufficient air is introduced from source 60 to complete the combustion of any carbon not already removed from the catalyst and to convert sulfur-containing iron deposits, e.g., iron sulfide, to iron oxide and sulfur oxides. The sulfur oxides are vented from the system via lines 35b, 40 and 41. While in this preferred embodiment of my invention, I cut off the air supply before substantial oxygen contacts iron sulfide, it should be understood that under certain circumstances the air supply need not be cut off at all. By starting to depressure substantially before oxygen contacts the scale, air input may be continued so long as once-through purging is commenced prior to actual contact of substantial amounts of oxygen and scale. Under certain circumstances the depressuring step may also be eliminated, i.e., when no substantial amounts of sulfur oxides are formed prior to initiating once-through purging and adequate flow rates and distribution can be obtained at elevated pressure. Such operation is, of course, considered within the spirit of the present invention.

As soon as substantially all sulfur is oxidized and vented, as indicated by a decrease in the sulfur-oxide content or an increase in the oxygen content of gases leaving swing reactor 36, once-through purging is stopped, and recirculation of the gases is again established by closing valve in line 41 and opening valve in line 56. The system is then repressured to reforming pressure for reheating of the catalyst bed. During reheating, the flue gas should preferably contain a small amount of oxygen, e.g., at least about 0.1 mol percent, to assure substantially complete absence of carbon monoxide. Heat for raising catalyst bed temperature is supplied to the circulating flue gas by furnace 53.

If rejuvenation is required the introduction of flue gas is stopped and the introduction of air is continued so that the catalyst is treated with a circulating air stream at a pressure of about 100 to 350 pounds per square inch gage and a temperature of about 950° F. to 1100° F. for a period of about one-half hour to twelve hours or more depending upon the extent of rejuvenation required.

After the regeneration (or after rejuvenation if rejuvenation has been effected) the introduction of air is stopped, and flue gas is again circulated to adjust catalyst bed temperature, if necessary. Simultaneously, additional flue gas is introduced from source 42 to displace oxygen from the swing reactor and from the regeneration system. Part of the circulating gases is vented via lines 58 and/or 41 at about the same rate as flue gas is added, thereby maintaining pressure substantially constant. After oxygen content is reduced below at least about 1 mol percent, the valves in lines 54 and 56 are closed and the introduction of flue gas is stopped. Swing reactor 56 is then depressured to about atmospheric by slowly opening valve in line 58. After depressuring, valve in line 56 is again opened and swing reactor 36 is again purged at about atmospheric pressure with flue gas to remove all residual oxygen via line 58, after which valves in lines 54 and 56 are closed.

After removal of all oxygen, the system is purged at about atmospheric pressure with hydrogen-rich recycle gas from line 15, which is introduced through lines 63, 40 and 35b by opening the valve in line 63. Valve in line 58 is then set to hold back reforming pressure, i.e., 300 pounds per square inch gage, and a system is pressured up with hydrogen-rich recycle gas. When the reactor is thus brought to desired operating pressure, valves in lines 63, 35b and 37b are closed, and the reactor may be placed on-stream by opening valves in lines 35 and 37. Because of my procedure as hereinabove described, sulfating poisoning of the catalyst is avoided, pressure-drop difficulties are alleviated, and the resulting elemental iron deposits assist in removal of additional sulfur from reactants during subsequent processing.

*Example*

To illustrate still further how my method of regeneration copes with the problem of sulfur deactivation of platinum-alumina catalyst during regeneration, data were obtained on a commercial Ultraformer having a capacity of about 8000 barrels per calendar day and having the same basic design as described hereinabove and shown in the accompanying drawing except that the unit had four reactors plus a swing reactor rather than three reactors plus a swing reactor. Each reactor was loaded with fresh platinum-alumina catalyst containing about 0.6 weight percent platinum, about 0.6 weight percent chlorine, and about 0.1 weight percent sulfur. Charge stock was of Mid-Continent origin and had an ASTM boiling range within the range of about 180 to 400° F. and a sulfur content in the range of about 200–300 parts per million. Operating conditions were temperature in the range of about 900 to 950° F., pressuure in the range of about 275 to 325 pounds per square inch gage, weight-hourly space velocity of about 1.0 to 1.5, and recycle gas rate of about 5000 standard cubic feet per barrel. Product octane number varied in the range of about 85 to 95 Research, clear.

In a typical regeneration cycle, without stopping the supply of oxygen as the flame front reached the iron sulfide scale, sulfur oxide content of gases entering the water spray tower increased from 30 to 430 parts per million. At the same time sulfur oxide content of regeneration gases leaving the water spray tower increased from 15 to 120 parts per million. Simultaneously, pH of the water effluent from the tower dropped sharply from 6 to 2.5. As the result of such operation over a two-month period, sulfur content of the catalyst increased from the fresh catalyst level of about 0.1 weight percent to levels within the range of about 0.4 to 1.5 weight percent. Catalyst activity was correspondingly reduced to less than half that of fresh catalyst activity.

In subsequent cycles, when air injection was stopped as soon as the flame front entered the iron sulfide scale, in accordance with my invention, pH of the water effluent quickly returned to 6. Dropping pressure then eliminates substantially all of the sulfur oxides already formed, and continuing the conversion of iron sulfides to iron and sulfur oxides on a once-through basis gets rid of substantially all sulfur without sulfating the platinum-alumina catalyst. Operations without sulfating the catalyst permits long periods of sustained operations at, or better than, fresh catalyst activity.

While my invention has been described as applied to regenerating platinum-alumina catalyst in an Ultraforming unit, it should be understood that it is equally applicable to other regenerative platinum processes, e.g., Powerforming (The Oil and Gas Journal, vol. 54, No. 46, March 19, 1956, at page 150). It should also be understood that while my invention has been described as applied to hydroforming, it is equally useful for protecting platinum-alumina catalyst in other hydrocarbon conversion processes employing oxidative regeneration, e.g., isomerization, hydrogenation, hydrocracking, dehydrogenation and the like, wherein sulfur-containing deposits may be present at one side of the catalyst bed and not at the other. Various alternative processing arrangements and operating conditions will be apparent in the above description to those skilled in the art.

Having thus described the invention, I claim:

1. In a hydrocarbon conversion process wherein a bed of platinum-alumina catalyst in at least one reaction zone is contacted in a down-flow direction with sulfur-containing hydrocarbons under conversion conditions so that iron deposits which accumulate on top of the platinum-alumina catalyst bed contain sulfur, the improved method of regenerating said catalyst after deposition of carbonaceous deposits thereon which comprises contacting said catalyst bed at elevated pressure in an up-flow direction with recycled flue gas into which controlled amounts of oxygen are introduced, whereby said carbonaceous deposits are progressively burned from the catalyst by an upward-flowing combustion front; stopping the introduction of oxygen into said recycled flue gas when said combustion front approaches the top of said catalyst bed; depressuring; contacting said catalyst in an up-flow direction with once-through, oxygen-containing flue gas at reduced pressure until any remaining carbonaceous deposits are burned from the catalyst and sulfur in the iron deposits on top of said catalyst bed is substantially converted to sulfur oxides and removed from said reaction zone; repressuring said reaction zone with, and recycling around said reaction zone, flue gas so as to adjust the temperature of said catalyst bed to about conversion temperature; purging said reaction zone with an oxygen-free inert gas to remove oxygen therefrom; and thereafter introducing hydrocarbons therein.

2. The method of claim 1 wherein said recycled flue gas is washed with water after leaving said reaction zone and the introduction of oxygen into said recycled flue gas is stopped when the pH of said water falls below about 5.0.

3. The method of claim 1 wherein said oxygen-free inert gas is flue gas.

4. In a hydroforming process wherein a sulfur-containing naphtha is contacted with a bed of platinum-alumina catalyst in a down-flow direction in the presence of hydrogen-rich recycle gas and at reforming conditions, whereby sulfur-containing iron deposits accumulate adjacent to the top of said catalyst bed and coke deposits form on said platinum-alumina catalyst, the improved method of regenerating said catalyst which comprises contacting said catalyst bed in an up-flow direction at elevated pressure with recycled flue gas into which controlled amounts of air are introduced, whereby said coke deposits are burned from the catalyst by an upward-flowing combustion front; stopping the introduction of air into said recycled flue gas when said combustion front approaches the top of said catalyst bed; depressuring; again contacting said platinum-alumina catalyst up-flow with a once-through mixture of air and flue gas at reduced pressure for a period sufficient to remove any remaining coke deposits and to convert said sulfur containing iron deposits to iron and sulfur oxides and to remove said sulfur oxides; repressuring with a mixture of air and flue gas while simultaneously recirculating said mixture so as to adjust the temperature of said catalyst bed to reforming temperature; purging with flue gas until the oxygen content is reduced to a level below about 1 mol percent; again depressuring; purging with oxygen-free flue gas until oxygen is completely eliminated; purging said oxygen-free flue gas with hydrogen-rich recycle gas; repressuring; and introducing naphtha.

5. The method of claim 4 wherein said recycled flue gas is scrubbed with water and the approach of said flame front to the top of said bed of catalyst is detected by a drop in the pH of said water.

6. In a hydroforming process wherein a sulfur-containing naphtha is contacted in a plurality of reaction zones with beds of platinum-alumina catalyst in a down-flow direction in the presence of hydrogen-rich recycle gas at reforming conditions, whereby iron sulfides accumulate at the top of said beds and said platinum-alumina catalyst becomes coated with carbon deposits, the improved method of reactivating a bed of said catalyst which comprises contacting said bed in an up-flow direction with recycled flue gas into which controlled amounts of air are introduced, whereby said carbon deposits are burned from said catalyst by an upward-flowing flame front, said recycled flue gas being contacted with water after leaving the reaction zone containing said bed; stopping the introduction of air into said recycled flue gas when the pH of said water drops; depressuring said reaction zone to about atmospheric pressure; again contacting said platinum-alumina catalyst with a mixture of air and flue gas at about atmospheric pressure for a period sufficient to remove any remaining carbon deposits and to convert said iron sulfides to iron oxides and sulfur oxides and to remove said sulfur oxides from said reaction zone; repressuring said reaction zone with oxygen-containing flue gas while simultaneously heating and recirculating said mixture through said reaction zone so as to control the temperature of said catalyst bed; purging said reaction zone with flue gas until oxygen content of said reaction zone is reduced to a level of about 0.1 to 1 mol percent; again depressuring said reaction zone to about atmospheric pressure; purging said reaction zone with oxygen-free flue gas until oxygen is eliminated therefrom; purging said oxygen-free flue gas from said reaction zone with hydrogen-rich recycle gas; repressuring said reaction zone with hydrogen-rich recycle gas; and introducing naphtha vapors therein.

7. In a hydroforming process wherein a bed of platinum-alumina catalyst is contacted in a down-flow direction with a sulfur-containing naphtha under reforming conditions, wherein sulfur-containing iron deposits accumulate adjacent to the top of said bed, and wherein said catalyst is periodically regenerated by the method which comprises recirculating oxygen-containing flue gas in an up-flow direction through said bed whereby a combustion front passes through said bed in an upward direction, reheating said bed with recirculated flue gas, depressuring, purging, repressuring and introducing said sulfur-containing naphtha, the improvement in said method of regenerating said catalyst which comprises stopping the combustion front as it nears the top of the catalyst bed by cutting off the oxygen supply, depressuring, contacting said bed in an up-flow direction with once-through oxygen-containing flue gas and thereafter repressuring with flue gas prior to reheating said bed, whereby said platinum-alumina catalyst is protected from sulfate poisoning.

References Cited in the file of this patent

UNITED STATES PATENTS

| | | |
|---|---|---|
| 2,756,191 | Fritz | July 24, 1956 |
| 2,773,013 | Wolf et al. | Dec. 4, 1956 |
| 2,853,435 | Evering et al. | Sept. 23, 1958 |